United States Patent [19]

Imai

[11] 4,435,702
[45] Mar. 6, 1984

[54] CAPACITIVELY COUPLED ROTATIONAL SPEED DETECTOR

[75] Inventor: Youg Imai, Hachioji, Japan

[73] Assignee: Olympus Optical Company Limited, Tokyo, Japan

[21] Appl. No.: 293,944

[22] Filed: Aug. 18, 1981

[30] Foreign Application Priority Data

Aug. 19, 1980 [JP] Japan .............................. 55-116942[U]

[51] Int. Cl.³ .............................................. G01P 3/54
[52] U.S. Cl. ..................................... 340/671; 324/163
[58] Field of Search ......................... 340/671; 324/163

[56] References Cited

U.S. PATENT DOCUMENTS

| 2,805,677 | 9/1957 | Baird | 324/163 |
| 3,408,556 | 10/1968 | Gabor | 324/163 |
| 3,702,467 | 11/1972 | Melnyk | 340/671 |
| 4,199,800 | 4/1980 | Weit | 324/163 |

Primary Examiner—Glen R. Swann, III
Attorney, Agent, or Firm—Toren, McGeady and Stanger

[57] ABSTRACT

A rotating member having a plurality of electrodes at a predetermined pitch is secured to a rotating body of a rotary machine, opposite to the rotating member a stationary member having a plurality of electrodes at the same pitch as that of the rotating member is arranged, and a variation in electrostatic capacity between the electrodes of the rotating member and the electrodes of the stationary member is detected so as to produce an output corresponding to a rotational speed of the rotating body of the rotary machine in accordance with the variation in electrostatic capacity.

4 Claims, 8 Drawing Figures

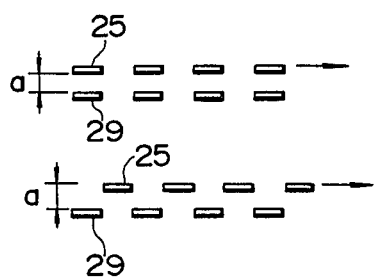
FIG. 6a
FIG. 6b
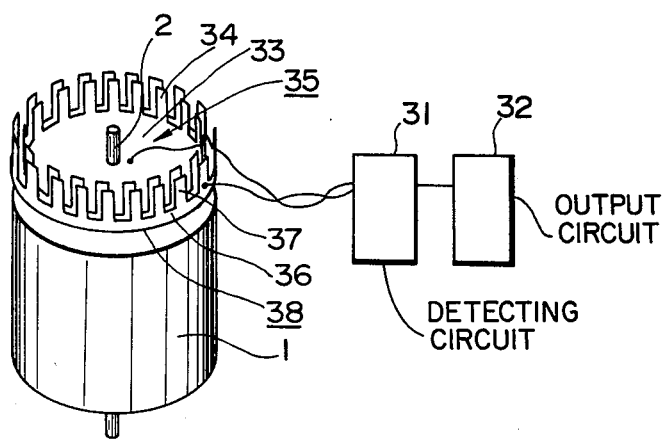
FIG. 7

CAPACITIVELY COUPLED ROTATIONAL SPEED DETECTOR

BACKGROUND OF THE INVENTION

1. Field of the Invention

The present invention relates to a rotational speed detector, and more particularly to a rotational speed detector which can perform detection of a rotational speed with a high degree of accuracy.

2. Description of Prior Art

Generally, the rotational speed of a rotating body, such as the rotor of a motor, is accurately controlled by using a rotational speed detector which detects the rotational speed and generates an output signal transmitted as a feedback signal to a rotational speed control system. A conventional speed detector attainable to the above-mentioned purpose, as illustrated in FIG. 1 of the accompanying drawings, has a disk-like permanent magnet 3 fitted onto the shaft 2 of a rotating body, such as for example the rotor of a motor 1, and a detecting head 4 positioned in the close vicinity of the disk-like permanent magnet 3 and including an iron core 41 wound with a winding coil 43 therearound, whereby the disc-like permanent magnet 3, when rotated, induces in the detecting head an electromotive force as an output signal which is detected through a detecting circuit 5.

However, the above-mentioned conventional rotational speed detector disadvantageously has a large inertial mass, since permanent magnet 3 of relatively large weight is directly fitted onto the shaft 2 of the rotor of the motor 1. Therefore, in case of, for example, a coreless motor provided with a rotor having a small inertial mass, there has been a disadvantage that the inertial mass of the magnet 3 cannot be neglected and gives a bad influence to the performance efficiency of the motor 1.

Further, another conventional rotational speed detector, as shown in FIG. 2 of the accompanying drawings, has also been used to attain the above-mentioned purpose, in which a disk plate 6 defining radial slits therein is fitted onto the shaft 2 of the rotor of the motor 1, and a light-emitting element 7 is arranged so as to oppose to a light receiving element 8 across the disk plate 6, thereby the light receiving element 8 receives intermittent light beam through the rotating disk plate 6 from the light-emitting element 7 energized by an electrical power supply 9, and produces an output which is then amplified through an amplifier circuit 10 and detected by a detecting circuit 11.

However, such a conventional rotational speed detector has to have the light-emitting element, the electrical power supply, the light receiving element, the amplifier circuit and etc., and therefore, exhibits a very complex arrangement, which inevitably causes the rotational speed detector to be very expensive.

SUMMARY OF THE INVENTION

It is accordingly a general object of the present invention is to eliminate the above-mentioned disadvantages experienced in the conventional rotational speed detectors.

Another object of the present invention is to provide a rotational speed detector which is of a miniaturized and light-weight type, and is obtainable at a low cost, although the detection of rotational speed with a high degree of accuracy is attainable as well.

According to the present invention, a novel and unique rotational speed detector is provided, which comprises a rotating member secured to a rotating body of a rotary machine and having a plurality of electrodes in a predetermined pitch; a stationary member positioned oppose to the rotating member and having a plurality of electrodes in the same pitch as that of the rotating member, and means for detecting a variation in electrostatic capacity between the opposing electrodes of the rotating member and the stationary member, and for producing an output in accordance with the variation in electrostatic capacity which depends on a rotational speed of the rotating body of the rotary machine.

In one embodying form of the present invention, each of the rotating member and the stationary member comprises a disc plate and a plurality of electrodes radially arranged on the surface of the disc plate.

In another embodying form of the present invention, each of the rotating member and the stationary member consists of a cylindrical body having a cylindrical wall and a plurality of electrodes extending along the surface of the cylindrical wall.

Further, according to the present invention, at least one of the rotating member and the stationary member is made of dielectric material.

Other objects and features of the present invention will become more fully apparent from the following detailed description of the invention taken in conjunction with the accompanying drawings.

BRIEF DESCRIPTION OF THE DRAWINGS

FIGS. 6a and 6b are views for explaining operations of the construction illustrated in FIG. 3; and FIG. 7 is a schematic view showing another embodiment of the invention.

DESCRIPTION OF THE PREFERRED EMBODIMENT

Figure 3:
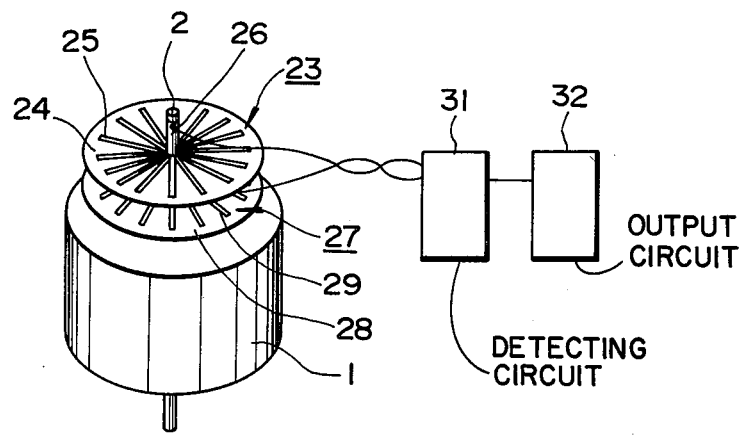
FIG. 3 is a schematic view showing one embodiment of the invention.
Figures 4, 5:
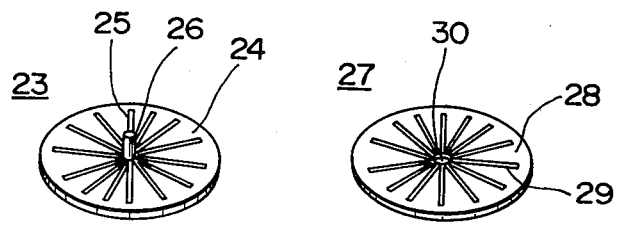
FIG. 4 is a perspective view showing a rotating member used in the construction illustrated in FIG. 3.
FIG. 5 is a perspective view showing a stationary member used in the construction illustrated in FIG. 3.

Referring to FIG. 3, reference numeral 1 denotes a rotary machine such as for example a motor having a rotating shaft 2 to which a rotating member 23 is secured. The rotating member 23 is formed, as for example shown in FIG. 4, so that it has a disc plate 24 made of insulating material, and a plurality of electrodes 25 radially extending and arranged at a constant pitch on the surface of the disc plate 24. These electrodes 25 are electrically connected together at one end, and then connected to a terminal 26.

Further, a stationary member 27 is provided facing the rotating member 23. The stationary member 27 is formed, as for example shown in FIG. 5, so that it has a disc member 28 made of insulating material and a plurality of electrodes 29 radially extending and disposed on the surface of the disc member 28 at the same pitch as the electrodes 25 on the surface of the rotating member 23.

Further, the electrodes 29 are equal in number to the electrodes 25, and also are connected together at one end and are, in turn, connected to a terminal 30.

Between the terminals 26 and 30 disposed and electrically connected is a detecting circuit 31 for detecting variation in electrostatic capacity between the electrodes 25, 29. The electrostatic capacity between the electrodes 25, 29 varies in dependence upon the relative positions of the electrodes 25, 29. That is: referring to FIG. 6a and FIG. 6b, the electrostatic capacity particularly differs between two positions respectively corresponding to where the electrodes 25 are aligned with the electrodes 29 with a gap a as shown in FIG. 6a, and where the electrodes 25 are not aligned with the electrodes 29 as shown in FIG. 6b. The detecting circuit 31 is arranged to detect variation in electrostatic capacity between these two positions.

The detecting circuit 31 has an output terminal to which an output circuit 32 is connected. The output circuit 32 is so constructed as to produce an output corresponding to the rotational speed of the motor 1 in accordance with the variation in electrostatic capacity received from the detecting circuit 31.

The mode of operation of this rotational speed detector thus constructed is as follows:

The rotating member 23 is rotated together with the rotating shaft 2 when the motor 1 is driven to rotate. As a result of the rotation of the rotating member 23, the electrostatic capacity between the electrodes 25 on the disc plate 24 and the electrodes 29 on the disc member 28 of the stationary member 27 decreases or increases, repeatedly. That is: the electrostatic capacity becomes maximum when the electrodes 25, 29 are aligned as shown in FIG. 6a, and minimum when the electrodes 25 are not aligned with the electrodes 29 as shown in FIG. 6b.

Therefore, the variation in electrostatic capacity between the electrodes 25, 29 is detected through the detecting circuit 31, and then transmitted to the output circuit 32 which produces the output corresponding to the rotational speed of the motor 1.

Figure 1:
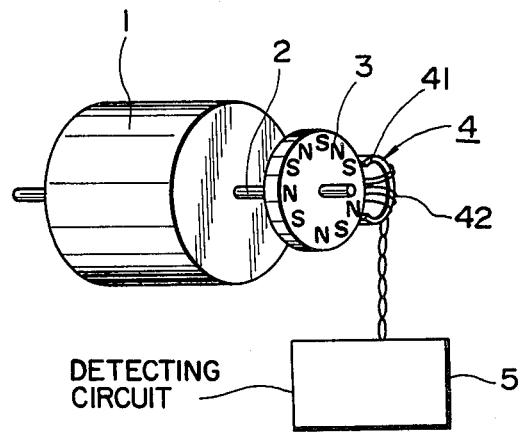
FIG. 1 is a schematic view showing an example of the prior art rotational speed detector mounted on a motor.
Figure 2:
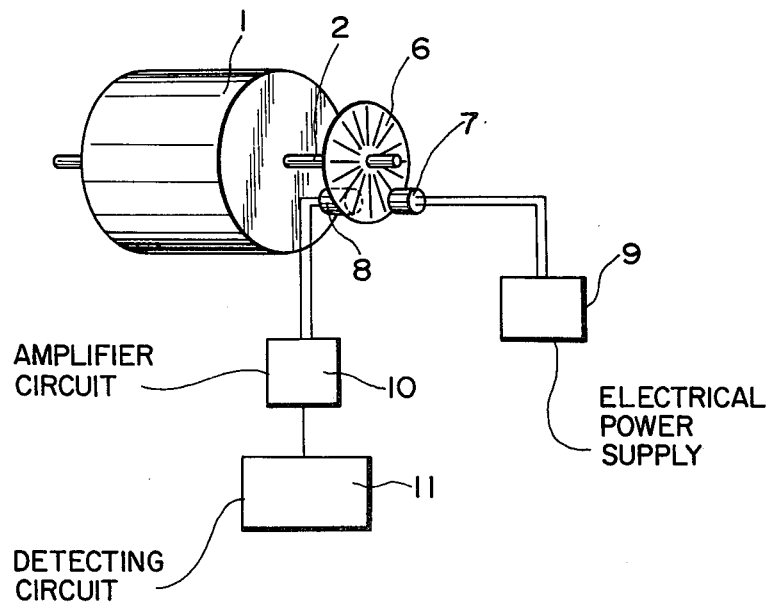
FIG. 2 is a schematic view showing another example of the prior art rotational speed detector also mounted on a motor.

Accordingly, with the construction above-mentioned, the rotational speed of the motor 1 can be obtained from the variation in electrostatic capacity between the electrodes 25, 29. Therefore, the aforementioned bad influence to the performance efficiency of the motor becomes negligible in comparison with the conventional rotational speed detector, as illustrated in FIG. 1, which causes the inertial mass of the rotor of the motor 1 to increase excessively, since, according to the present invention, the disc plate 24 having the electrodes 25, is alone provided as the rotating member 23 to the rotating shaft 22 of the motor 21.

In view of the structural view point, the rotational speed detector of the present invention can be miniaturized and light-weight as well as a thin construction, since the disc plate 24 of the rotating member 23 and the disc member 28 of the stationary member 27 are only arranged facing each other in an opposite relation. Further, due to the simple shape of the rotating member 23 and the stationary member 27, the rotational detector according to the present invention can easily manufactured at a low cost. Further more, unnecessary vibration can be avoided, since the interference between the electrodes 25, 29 is substantially negligible. And furthermore, the accuracy of the detection is remarkably improved due to that the variation in electrostatic capacity can be large as a whole, since the electrostatic capacity between the electrodes 25, 29 increases and decreases, repeatedly, over the surfaces of the rotating disc plate 24 and the disc member 28.

While the present invention has been explained in an embodying form, it will be obvious to those skilled in the art that various changes and modifications can be made without departing from the scope of the present invention as defined in the appended claims.

For example, the present invention may have a construction wherein to the rotating shaft 2 of the motor 1 is secured a rotating member 35 including a cylindrical body 33 and electrodes 34 extending along and disposed at a constant pitch on the cylindrical wall, and a stationary member 38 having a cylinder 36 and electrodes 37 extending along the cylindrical wall of the cylinder 36 at the same pitch as that of the electrodes 34, is set around the rotating member 35 with the cylindrical walls thereof facing each other. The other components as shown in FIG. 7 are identical as illustrated in FIG. 3. With the construction in FIG. 7, the substantially same advantageous effects can be expected.

It is also within the scope of the present invention to form at least one of the rotating member and the stationary member with dielectric materials such as for example polyester film. With this arrangement, very preferable effects can be obtained, since the variation in capacitance can become greater.

What we claim is:

1. A rotational speed detector comprising: a rotating body of a rotating machine having an axis so that said body rotates about the axis, a light-weight rotating member secured to said rotating body and having a first surface encircling said rotating body with a plurality of electrodes arranged on said first surface at a predetermined pitch and forming a continuous circle of alternating electrodes and spaces between said electrodes around said rotating body; a light-weight stationary member having a second surface extending around said rotating body and disposed in opposed facing relation to said first surface of said rotating member, and said second surface having a plurality of electrodes extending around said rotating body at the same pitch as that of the said electrodes of said rotating member with said electrodes on said second surface forming a continuous circle of alternating electrodes and spaces between said electrodes with said electrodes on said rotating member being simultaneously alignable with said electrodes on said stationary member during rotation; and means for detecting a variation in electrostatic capacity between said electrodes of said rotating member and said electrodes of said stationary member, and for producing an output corresponding to a rotational speed of said rotating body in accordance with the variation in electrostatic capacity.

2. A rotational speed detector as set forth in claim 1, wherein said rotating member and said stationary member each comprise a disc member with said disc member on said rotating member forming said first surface and said disc member on said stationary member forming said second surface and with said electrodes located on said disc members and extending radially outwardly from the axis of said rotating body.

3. A rotational speed detector as set forth in claim 1, wherein said rotating member and said stationary member each comprise a cylindrical member having a cylindrical wall, with said cylindrical wall of said rotating member forming said first surface and said cylindrical wall of said stationary member forming said second surface and with said electrodes located on each of said cylindrical walls in generally parallel relation with the axis of said rotating body.

4. A rotational speed detector as set forth in any one of claims 1 through 3, wherein at least one of said rotating member and said stationary member is formed of dielectric material.

* * * * *